Patented June 20, 1944

2,351,602

UNITED STATES PATENT OFFICE 2,351,602

CONDENSATION PRODUCT OF AN AMINO-TRIAZINE, AN ALDEHYDE, AND A HALOGENATED AMIDE

Gaetano F. D'Alelio, Pittsfield, Mass., assignor to General Electric Company, a corporation of New York No Drawing. Application September 6, 1941, Serial No. 409,838

19 Claims. (Cl. 260—42)

This invention relates to new condensation products and to methods of making the same. The invention is concerned more particularly with self-curing aminoplasts, by which are meant heat-convertible resinous condensation products prepared from amino or amido compounds and having the characteristic property of curing under heat or under heat and pressure to the insoluble, infusible state without the addition of a curing accelerator or catalyst.

This application is a continuation-in-part of the following copending applications of mine, all of which are assigned to the same assignee as the present invention: Serial No. 289,277, filed August 9, 1939, now Patent No. 2,285,418, issued June 9, 1942; Serial No. 346,962, filed July 23, 1940, now Patent No. 2,325,375, issued July 27, 1943; Serial No. 354,395, filed August 27, 1940, now Patent No. 2,325,376, issued July 27, 1943; Serial Nos. 371,393 and 371,394, filed December 23, 1940, now Patent Nos. 2,328,424 and 2,328,425, respectively, issued Aug. 31, 1943; Serial No. 378,933, filed Feb. 14, 1941, now Patent No. 2,321,586, issued June 15, 1943; Serial No. 378,934, filed February 14, 1941; and Serial No. 404,661, filed July 30, 1941, now Patent No. 2,312,688, issued March 2, 1943.

In application Serial No. 289,277 I disclosed and claimed new and useful compositions of matter comprising the condensation product of ingredients comprising (1) a urea, specifically the compound corresponding to the formula $CO(NH_2)_2$, (2) an aliphatic aldehyde, e. g., formaldehyde, and (3) certain halogenated amides, more particularly chlorinated acetamides.

In application Serial No. 346,962 I disclosed and claimed compositions comprising the product of reaction of ingredients comprising (1) an amidogen compound, more particularly a urea and an aminotriazine, (2) an aliphatic aldehyde and (3) a malonic ester corresponding to the formula $CH_2(COOR)_2$, where R represents a monovalent hydrocarbon radical. I also disclosed and claimed in the aforesaid application condensation products of a plurality of compounds including (1) urea or melamine or urea and melamine, (2) formaldehyde and (3) a malonic ester such as above mentioned. I also disclosed in the said application that various curing reactants, including mono-, di- and tri-chloroacetamides, may be incorporated into the compositions to impart accelerated curing characteristics thereto.

In application Serial No. 354,395 I disclosed and claimed compositions comprising a resinous reaction product obtained by partially condensing simultaneously ingredients comprising the following components in the stated molar ratios: (1) 1 mol of an amidogen compound, more particularly a urea and an aminotriazine, e. g., melamine, (2) at least 1 mol of formaldehyde and (3) from 0.01 to 0.35 mol of a keto-ester corresponding to the formula $RCOCH_2COOR'$, where R and R' represent hydrocarbon radicals, specifically ethyl acetoacetate. I likewise disclosed in this application that mono-, di- and tri-chloroacetamides and various other curing reactants may be incorporated into the compositions to impart accelerated curing characteristics thereto.

In application Serial No. 371,393 I disclosed and claimed compositions of matter comprising the product of reaction of (1) a chlorinated acetamide and (2) a partial condensation product of ingredients comprising essentially (a) an amidogentriazine wherein the number of hydrogen atoms attached directly to amidogen nitrogen is at least two, specifically melamine, and (b) a preformed compound consisting of a urea containing at least two methylol groups attached directly to the nitrogen of the urea, specifically preformed dimethylol urea.

In application Serial No. 371,394 I disclosed and claimed compositions of matter comprising the product of reaction of (1) a chlorinated acetamide and (2) a partial condensation product of ingredients comprising essentially (a) a preformed methylol amidogentriazine in which the methylol group is attached directly to the nitrogen of the amidogen group, specifically a preformed methylol melamine, and (b) a preformed compound consisting of a urea containing at least two methylol groups attached directly to the nitrogen of the urea, specifically preformed dimethylol urea.

In application Serial No. 378,933 I disclosed and claimed compositions comprising a reaction product of ingredients comprising a preformed polymethylol melamine, specifically preformed trimethylol melamine, and a halogenated acetamide, specifically a chlorinated acetamide.

In application Serial No. 378,934 I disclosed and claimed compositions comprising the product of reaction, under heat, of ingredients comprising preformed dimethylol urea and a halogenated acetamide, specifically a chlorinated acetamide, as well as compositions comprising the product of reaction, under heat, of ingredients comprising preformed dimethylol urea, an aminotriazine and a halogenated acetamide.

In application Serial No. 404,661 I disclosed and claimed compositions comprising the reaction product of ingredients comprising an aldehyde and a triazine derivative of the class embracing the mono-, di- and tri-ureido triazines. Specific claims were made to a heat-curable resinous composition comprising (1) a partial condensation product of ingredients comprising 2-ureido 4,6-diamino 1,3,5-triazine and formaldehyde and (2) a curing reactant; to a heat-curable composition comprising the heat-convertible product of reaction of (1) a partial condensation product of ingredients comprising urea, 2-ureido 4,6-diamino 1,3,5-triazine and formaldehyde and (2) a chlorinated acetamide; and to a resinous reaction product of ingredients comprising dimethylol urea, 2-ureido 4,6-diamino 1,3,5-triazine and chloroacetamide.

The present invention is directed to new and useful condensation products wherein an aminotriazine (amidogentriazine) is caused to react with an aldehyde in the presence of a halogenated amide of the kind hereafter mentioned.

In the production of aminoplasts it has heretofore been common practice in converting such materials to the insoluble, infusible state to incorporate into the condensation product or into the molding composition a latent or an active (direct) curing catalyst. As pointed out more particularly hereafter, this technique and the final products have not been wholly satisfactory.

I have discovered that self-curing aminoplasts can be produced by condensing an aminotriazine (that is, an aldehyde-reactable aminotriazine), an aldehyde, including polymeric aldehydes and aldehyde-addition products, and a halogenated amide selected from the class consisting of alpha halogenated amides, beta halogenated amides and alpha beta halogenated amides, which amides contain at least one —$CONH_2$ grouping. Examples of such halogenated amides are the halogenated acetamides, more particularly the mono-, di- and tri-chloroacetamides, the mono-, di- and tri-bromoacetamides, the mono-, di- and tri-iodoacetamides, the mono-, di- and tri-fluoroacetamides, and similar halogeno derivatives of other amidated monocarboxylic and polycarboxylic acids such as propionic, butyric, valeric, malonic, adipic, maleic, itaconic, fumaric, tricarballylic, etc., acids. In all cases the amide grouping of the halogenated amide is capable of reaction with the aldehydic component, since this amide grouping possesses a nitrogen atom to which are attached two hydrogen atoms.

It has been suggested heretofore that aminotriazine-aldehyde condensation products be modified by incorporating therein an amide, specifically urea, thiourea, sulfamide and the like However, to the best of my knowledge and belief it was not known or suggested prior to my invention to intercondense an alpha halogenated amide, a beta halogenated amide or an alpha, beta halogenated amide, which amides contain at least one —$CONH_2$ grouping, with an aminotriazine and an aldehyde thereby to obtain an intercondensation product of accelerated curing characteristics. I am aware that it was suggested prior to my invention to prepare urea-formaldehyde molding compositions containing various compounds capable of developing acidity during the molding operation and that iso-dibrom succinic anilide specifically has been mentioned as a compound having this characteristic property. Iso-dibrom succinic anilide is different from, and is not the equivalent of, the halogenated amides used in carrying the present invention into effect. Salts of the mono- and di-halogenated aliphatic carboxylic acids, for example sodium and ammonium mono-chloroacetates, also have been suggested as addition agents to urea-formaldehyde molding compositions to yield heat-convertible masses that cure to an insoluble, infusible state under the heat and pressure of molding. Such salts likewise are entirely different from, and are not the equivalent of, the halogenated amides required for practicing the present invention. These salts are latent catalysts and, unlike the amides which I use, are incapable of condensation with an aldehyde.

In the heat-convertible resinous condensation products of this invention the self-curing property of the product is imparted thereto by creating a resin molecule having this inherent characteristic. This is a discovery of great practical significance. It makes possible the production of molding compositions of uniform curing characteristics, which compositions yield molded articles free from imperfections, such as blisters, discolorations, etc. Such imperfections are due usually to localized curing that often occurs in aminoplasts of the admixed-catalyst type. As the value of the molded article, especially light-colored articles, is materially influenced by its appearance, it is clear that the discovery of any means for decreasing or eliminating entirely the production of imperfect articles that must be scrapped or sold at reduced price is of considerable commercial importance.

The resin syrups and molding compositions of this invention may be stored for long periods of time without material alteration. In marked contrast the prior heat-convertible aminoplasts of the aminotriazine-aldehyde type, more particularly those containing direct or active curing catalysts such as acids, for example hydrochloric, ethyl sulfuric, phthalic, chloroacetic, phosphoric, etc., lacked time or storage stability. This necessitated early use of the material after incorporating the catalyst.

Furthermore, the molding compositions of this invention cure rapidly under heat or under heat and pressure and have good plastic flow during molding. Hence molded articles of even the most complicated designs can be produced rapidly and economically. The cured products have good light stability, excellent water resistance and surface finish and, in general, meet the strength, hardness and other requirements of the particular service application.

In carrying the present invention into effect the condensation reaction between the aldehyde and the other components preferably is started under neutral or alkaline conditions. Neutral conditions may be established by neutralizing (if necessary) either the mixed components or the individual component or components prior to admixture. Any substance yielding an alkaline aqueous solution may be used in obtaining alkaline conditions for the initial condensation reaction. In some cases it may be desirable, in order more quickly to initiate reaction between the starting materials, to add a small amount of a suitable organic or inorganic acid. Thereafter the solution is treated to eliminate acidic conditions due to acid or acid salts. That is, the mass is neutralized or is made alkaline by adding an alkaline substance. The reaction then is caused to proceed further to produce the self-curing aminoplasts of this invention.

In obtaining the neutral, alkaline or acid conditions above described I may use, for example, ammonia, sodium hydroxide or carbonate, calcium hydroxide, methyl amine, diethyl amine, tri-isopropyl amine, ethanol amines, tri-isopropanol amine, etc., mixtures of such alkaline substances, inorganic or organic acids such as hydrochloric, sulfuric, phosphoric, acetic, acrylic, crotonic, malonic, etc., or acid salts such as sodium acid sulfate, monosodium phosphate, monosodium phthalate, etc., or mixtures of acids, of acid salts, or of acids and acid salts.

Various ways may be employed for effecting initial reaction between the components. For example, I may first mix all the reactants and effect condensation between the mixed reactants in the presence or absence of addition agents, as for instance condensation catalysts, fillers, plasticizers, other natural or synthetic resinous bodies, solvents or diluents, etc. A preferred method is to add the halogenated amide to a partial condensation product of an aminotriazine and an aldehyde and effect further condensation between the components. In producing such a partial condensation product I advantageously may cause the condensation reaction between the aminotriazine and the aldehyde to take place in the presence of a primary condensation catalyst and a secondary condensation catalyst. The primary catalyst preferably is either an aldehyde-non-reactable, nitrogen-containing basic tertiary compound, e. g., tertiary amines such as trialkyl (e. g., trimethyl, triethyl, etc.) amines, triaryl (e. g., triphenyl, etc.) amines, etc., or an aldehyde-reactable nitrogen-containing basic tertiary compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, should be a fixed alkali, for instance a carbonate, cyanide or hydroxide of an alkali metal (e. g., sodium, potassium, lithium, etc.).

Another method of effecting reaction between the ingredients comprises first condensing the halogenated amide with the aldehyde, adding the resulting partial condensation product to an amino-triazine-aldehyde partial condensation product and then causing the reaction to proceed further. Or, I may condense or partially condense the halogenated amide with a mol excess of an aldehyde, add an aminotriazine to this condensation product and effect further reaction between the components. Still other ways may be employed in combining the components and in producing the unmodified and modified condensation products of this invention, as will be readily understood by those skilled in the art as the description of the invention proceeds. These condensation reactions may proceed under a wide variety of time, temperature and pressure conditions. The temperature of the reaction may vary from room temperature to the reflux temperature of the reactants at reduced, atmospheric or super-atmospheric pressures.

The products obtained as described above properly may be designated as intermediate condensation products. They are heat-convertible resinous bodies which alone or mixed with fillers, pigments, dyes, lubricants, plasticizers, etc., may be used, for example, as molding compositions. The modified and unmodified resinous masses are self-convertible under heat or under heat and pressure to the insoluble, infusible state.

Depending upon the particular reactants employed and the particular conditions of reaction, the intermediate condensation products vary from clear, colorless, syrupy, water-soluble liquids to viscous, milky dispersions and gel-like masses of decreased solubility in ordinary solvents, such as alcohol, glycol, glycerine, water, etc. These liquid intermediate condensation products may be concentrated or diluted further by the removal or addition of volatile solvents to form liquid coating compositions of adjusted viscosity and concentration. These liquid compositions may be used, for instance, as surface-coating materials, in the production of paints, varnishes, lacquers, enamels, etc., for general adhesive applications, as anti-creasing agents, in producing laminated articles and for numerous other purposes. The liquid intermediate condensation products also may be used directly as casting resins. Those intermediate products of a gel-like nature may be dried and granulated to form clear, unfilled, heat-convertible resins.

In order that those skilled in the art better may understand how this invention may be carried into effect, the following examples are given by way of illustration. All parts are by weight.

*Example 1*

| | Parts |
|---|---|
| Melamine | 63.0 |
| Aqueous formaldehyde (approx. 37.1% HCHO) | 140.0 |
| Aqueous ammonia (approx. 28% NH$_3$) | 3.0 |
| Sodium hydroxide in 10 cc. water | 0.2 |
| Chloroacetamide (monochloroacetamide) | 1.0 |

All of the above components with the exception of the chloroacetamide were heated together under reflux at the boiling temperature of the mass for 15 minutes. The chloroacetamide was added to the resulting syrup and refluxing was continued for an additional 5 minutes to cause the chloroacetamide to intercondense with the melamine-formaldehyde partial condensation product. When a sample of the resulting product was heated on a 140° C. hotplate, it cured rapidly to an insoluble, infusible state.

A molding compound was made from the syrupy condensation product containing the intercondensed chloroacetamide by mixing it with 65 parts alpha cellulose in flock form and 0.4 part of a mold lubricant, specifically zinc stearate. The wet compound was dried at room temperature for about 16 hours. A sample of the dried compound was molded at 130° C. for 3 minutes under a pressure of 2,000 pounds per square inch. The molded piece was hard and well cured throughout, was exceptionally light in color and had excellent gloss. Another sample was molded under the same temperature and pressure conditions, but the time of molding was increased to 6 minutes. When this molded piece was tested for water resistance by immersing it in boiling water for 15 minutes, there was no change in its color or gloss or any other visible evidence that it had been affected in any way by this rigid test. Both molded pieces were uniform and well knitted together. The molding compound showed good plastic flow during molding.

*Example 2*

| | Parts |
|---|---|
| Melamine | 63.0 |
| Aqueous formaldehyde (approx. 37.1% HCHO) | 140.0 |
| Aqueous ammonia (approx. 28% NH$_3$) | 3.0 |
| Sodium hydroxide in 15 parts water | 0.06 |
| Chloroacetamide | 0.5 |

All of the above components with the exception of the chloroacetamide were heated together under reflux at boiling temperature for 10 minutes. The chloroacetamide was now added and refluxing was continued for an additional 5 minutes. The resulting syrupy condensation product was mixed with 67 parts alpha cellulose and 0.4 part zinc stearate to form a molding compound. The wet compound was dried at 67° C. for 2 hours. Well-cured molded pieces having excellent gloss were produced by molding samples of the dried compound for 3 minutes at 130° C. under a pressure of 2,000 pounds per square inch.

*Example 3*

Same formula and procedure as in Example 2 with the exception that 4 parts dichloroacetamide were used instead of 0.5 part monochloroacetamide, the wet molding compound was dried for 1¼ hours instead of 2 hours at 67° C. and the molding time was 2 minutes instead of 3 minutes. The molded pieces were well cured throughout, had excellent gloss and were very light in color.

*Example 4*

Same formula and procedure as in Example 2 with the exception that 0.5 part trichloroacetamide were used instead of 0.5 part monochloroacetamide. The wet molding compound was dried at 67° C. for 1¼ hours. A sample of the dried compound was molded at 130° C. under a pressure of 2,000 pounds per square inch, yielding a well-cured molded piece that could be pulled hot from the mold and that did not become distorted upon cooling to room temperature.

*Example 5*

| | Parts |
|---|---|
| Melamine | 143 |
| Aqueous formaldehyde (approx. 37.1% HCHO) | 245 |
| Aqueous ammonia (approx. 28% NH₃) | 5 |
| Aqueous sodium hydroxide solution (0.465 N) | 7 | were heated together under reflux for 15 minutes to yield a clear syrup. When a sample of this syrup was mixed with from 1 to 2% by weight thereof of alpha, beta-dichloropropionamide and heated on a 135° C. hotplate, the syrup bodied to a resinous mass that upon further heating was converted to a cured (insoluble and infusible) state.

*Example 6*

Same as Example 5 with the exception that from 1 to 2% by weight (of the syrup) of alpha, beta-dibromopropionamide was used instead of alpha, beta-dichloropropionamide. The resinous mass cured rapidly to an insoluble, infusible state upon heating on a 135° C. hotplate.

*Example 7*

| | Parts |
|---|---|
| Melamine | 113.2 |
| Aqueous formaldehyde (approx. 37.1% HCHO) | 280.0 |
| Aqueous ammonia (approx. 28% NH₃) | 6.0 |
| Diethyl malonate | 21.6 |
| Sodium hydroxide in 12 parts water | 0.12 |
| Trichloroacetamide | 2.0 |

All of the above components with the exception of the trichloroacetamide were heated together under reflux at the boiling temperature of the mass for 15 minutes. The trichloroacetamide was now added and refluxing was continued for an additional 5 minutes. A molding (moldable) compound was made by mixing the resulting hot resinous syrup with 133 parts alpha cellulose and 0.8 part zinc stearate. The wet compound was dried at 67° C. for 65 hours. A sample of the dried compound was molded for 4 minutes at 130° C. under a pressure of 2,000 pounds per square inch. The molded piece was well cured throughout and the molding compound showed good plastic flow during molding. The diethyl malonate functions as an intercondensable plasticizer to improve the plasticity of the compound during molding.

*Example 8*

| | Parts |
|---|---|
| Melamine | 120.0 |
| Aqueous formaldehyde (approx. 37.1% HCHO) | 280.0 |
| Ethyl acetoacetate | 6.5 |
| Aqueous ammonia (approx. 28% NH₃) | 6.0 |
| Sodium hydroxide in 20 parts water | 0.16 |
| Chloroacetamide | 2.0 |

The same procedure was followed in making the syrup, molding compound and molded article as described in Example 7 with the exception that the wet compound was dried at 67° C. for 1½ hours and the molding time was only 2 minutes. A well-cured molded piece that could be pulled hot from the mold without distortion was obtained.

*Example 9*

| | Parts |
|---|---|
| Melamine | 28.3 |
| Aqueous formaldehyde (approx. 37.1% HCHO) | 70.0 |
| Aqueous ammonia (approx. 28% NH₃) | 1.5 |
| Sodium hydroxide in 2.5 parts water | 0.1 |
| Monomethylol methyl ethyl ketone (2.15 parts) and dimethylol methyl ethyl ketone (0.50 part) in 2.08 parts water, making a total of | 4.73 |
| Chloroacetamide | 0.64 |

All of the above components with the exception of the chloroacetamide were heated together under reflux at the boiling temperature of the mass for 10 minutes. At the end of this reaction period the stated amount of chloroacetamide was added and refluxing was continued for an additional 5 minutes. A molding compound was made by mixing the resulting hot resinous syrup with 36 parts alpha cellulose and 0.25 parts zinc stearate. The wet compound was dried at 67° C. for 1½ hours. A sample of the dried compound was molded for 3 minutes at 130° C. under a pressure of 2,000 pounds per square inch. The molded piece was pulled hot from the mold. It did not become distorted upon cooling to room temperature. It was well cured throughout and its water resistance was excellent.

*Example 10*

| | Parts |
|---|---|
| Melamine | 31.5 |
| Urea | 15.0 |
| Aqueous formaldehyde (approx. 37.1% HCHO) | 100.0 |
| Aqueous ammonia (approx. 28% NH₃) | 3.0 |
| Sodium hydroxide in 3 parts water | 0.06 |
| Chloroacetamide | 0.57 |

All of the above components with the exception of the chloroacetamide were heated together under reflux at boiling temperature for 15 minutes. The chloroacetamide was now added and refluxing was continued for an additional 5 minutes. The hot resin syrup was mixed with 47.5 parts alpha cellulose and 0.4 part zinc stearate to form a molding compound. The wet compound was air dried at room temperature until sufficient moisture had been removed to yield a molding compound that could be molded satisfactorily. A well-cured molded piece was produced by molding a sample of the dried compound for 2 minutes at 130° C. under a pressure of 2,000 pounds per square inch.

*Example 11*

|  | Parts |
|---|---|
| Melamine | 31.5 |
| Thiourea | 19.0 |
| Aqueous formaldehyde (approx. 37.1% HCHO) | 100.0 |
| Aqueous ammonia (approx. 28% NH₃) | 3.0 |
| Sodium hydroxide in 3 parts water | 0.06 |
| Chloroacetamide | 0.39 |

The same procedure was followed in making the resin syrup as described under Example 10. The hot syrup was mixed with 49 parts alpha cellulose and 0.4 part zinc stearate to form a molding compound. The wet compound was dried at room temperature. Well-cured molded pieces were obtained by molding samples of the dried compound at 130° C. under a pressure of 2,000 pounds per square inch.

*Example 12*

|  | Parts |
|---|---|
| Melamine | 47.25 |
| Dicyandiamide | 10.5 |
| Aqueous formaldehyde (approx. 37.1% HCHO) | 120.0 |
| Aqueous ammonia (approx. 28% NH₃) | 3.0 |
| Sodium hydroxide in 3 parts water | 0.06 |
| Chloroacetamide | 0.41 |

All of the above ingredients with the exception of the chloroacetamide were heated together under reflux for 15 minutes. The chloroacetamide was now added and the reaction mass was brought to boiling temperature. The resulting hot syrup was mixed with 61 parts alpha cellulose and 0.4 part zinc stearate to form a molding compound. The wet compound was dried at room temperature. Well-cured molded pieces were produced by molding samples of the dried compound at 140° C. under a pressure of 2,000 pounds per square inch.

*Example 13*

|  | Parts |
|---|---|
| Melamine | 126 |
| Formaldehyde-addition product, specifically preformed dimethylol urea | 360 |
| Water | 306 | were heated together under reflux at boiling temperature for 15 minutes. To 230 parts of the resulting syrup was added 1 part chloroacetamide, followed by refluxing the mixture for 5 minutes to cause the chloroacetamide to intercondense with the melamine-dimethylol urea resinous partial condensation product. The hot syrup was mixed with 70 parts alpha cellulose in flock form and 0.4 part zinc stearate to form a molding compound. The wet compound was dried at 68° C. A sample of the dried compound was molded at 130° C. under a pressure of 2,000 pounds per square inch, yielding an excellently cured molded article that showed good flow characteristics during molding. The molded piece did not disintegrate nor show any material change in surface appearance when immersed in boiling water for 15 minutes. On an accelerated test to determine its relative resistance to water, it showed only 2.7% water-absorption. (The water absorption value is determined by immersing a weighed sample of the molded article for 15 minutes in boiling water, immersing immediately in cold water for 5 minutes, after which the sample is wiped dry, weighed immediately and the percentage increase in weight recorded as the per cent water absorbed.)

*Example 14*

|  | Parts |
|---|---|
| Melamine | 42.0 |
| Preformed dimethylol urea | 120.0 |
| Aqueous ammonia (approx. 28% NH₃) | 6.0 |
| Sodium hydroxide in 5 parts water | 0.1 |
| Chloroacetamide | 1.5 |
| Water | 160.0 |

All of the above components with the exception of the chloroacetamide were heated together under reflux at boiling temperature for 30 minutes, after which the chloroacetamide was added and refluxing was continued for an additional 5 minutes. A small sample of the syrup was tested for its curing characteristics by heating it on a 140° C. hotplate. It converted rapidly to a hard, infusible resin.

A molding compound was made by mixing the syrup produced as described above with 70 parts alpha cellulose and 0.4 part zinc stearate. The wet compound was dried for 2 hours at 64° C. A well-cured molded piece having good water resistance was obtained by molding a sample of the dried compound for 3 minutes under a pressure of 2,000 pounds per square inch.

*Example 15*

The same formula and procedure were followed in making a resin syrup as described under Example 14 with the exception that 2 parts trichloroacetamide were used instead of 1.5 parts chloroacetamide. When a small sample of the syrup was tested on a 140° C. hotplate, it cured readily to an insoluble, infusible resin. A molding composition, prepared as described under Example 14, was dried at 64° C. for 2¼ hours. Molding a sample of the dried compound for 5 minutes at 130° C. under a pressure of 2,000 pounds per square inch yielded a well-cured molded article of high resistance to water and of good surface appearance.

*Example 16*

|  | Parts |
|---|---|
| 2-ureido 4,6-diamino 1,3,5-triazine | 16.9 |
| Aqueous formaldehyde (approx. 37.1% HCHO) | 32.4 |
| Sodium hydroxide in 1 part water | 0.02 | were heated together under reflux at the boiling temperature of the mass for 15 minutes. The resulting resinous syrup was clear while hot and had a pH of 8.62. To 23 parts of this syrup was added 0.1 part chloroacetamide and the mixture was heated under reflux at boiling temperature to cause the chloroacetamide to intercondense with the partial condensation product of the triazine derivative and the formaldehyde. A molding compound was made from the resulting syrup by mixing it with 7 parts alpha cellulose and 0.04 part zinc stearate. The wet compound was dried at 72° C. for 1 hour. A sample of the dried compound was molded at 130° C. under a pressure of 2,000 pounds per square inch, yielding a well-cured molded article having a smooth, glossy surface appearance. The molding compound showed excellent flow characteristics during molding.

The molded article also had excellent water resistance as shown by the fact that, when immersed in boiling water for 15 minutes and then in cold water for 5 minutes, it absorbed only 0.31% by weight of water.

*Example 17*

| | Parts |
|---|---|
| 4,6-diamino s-triazinyl-2 carbamyl-methyl sulfide | 400.0 |
| Aqueous formaldehyde (approx. 37.1% HCHO) | 486.0 |
| Aqueous ammonia (approx. 28% NH₃) | 40.0 |
| Aqueous sodium hydroxide solution (0.465 N) | 0.5 |
| Water | 200.0 | were heated together under reflux for 15 minutes to yield a clear syrup. When a sample of this syrup was mixed with from 1 to 2% by weight thereof of chloroacetamide (monochloroacetamide) and heated on a 135° C. hotplate, the syrup bodied to a resinous mass that upon further heating cured to an insoluble, infusible state. When individual samples of the syrup were similarly treated with dichloroacetamide and trichloroacetamide, the resin was converted to an insoluble and infusible state, although the cure time was a little longer than with chloroacetamide.

*Example 18*

Same as Example 17 with the exception that in one case alpha, beta-dichloropropionamide and in another test alpha, beta-dibromopropionamide was substituted for the chlorinated acetamide. Both the chlorinated propionamide and the brominated propionamide caused the resin syrup to convert rapidly to an insoluble and infusible or cured state upon heating a sample of the syrup containing the same on a 135° C. hotplate.

It will be understood, of course, that the halogenated amides mentioned in the above examples are only by way of illustration and that other halogenated amides selected from the class consisting of alpha halogenated amides, beta halogenated amides and alpha beta halogenated amides, which amides contain at least one —CONH₂ grouping, may be used in carrying this invention into effect. Additional examples of such halogenated amides are:

Alpha chloropropionamide
Beta chloropropionamide
Alpha dichloropropionamide
Beta dichloropropionamide
Alpha bromopropionamide
Beta bromopropionamide
Alpha dibromopropionamide
Beta dibromopropionamide
Alpha chlorobutyramide
Beta chlorobutyramide
Alpha dichlorobutyramide
Beta dichlorobutyramide
Alpha, beta dichlorobutyramide
Alpha bromobutyramide
Beta bromobutyramide
Alpha dibromobutyramide
Beta dibromobutyramide
Alpha, beta dibromobutyramide
Beta trichloropropionamide
Beta tribromopropionamide
Alpha chloro, beta dichloro propionamide
Alpha bromo, beta dibromo propionamide
Alpha chloro, beta bromo propionamide
Beta iodopropionamide
Alpha chlorovaleramide
Beta bromovaleramide
Alpha dichlorovaleramide
Beta dichlorovaleramide
Alpha dibromovaleramide
Beta dibromovaleramide
Alpha, beta dichlorovaleramide
Alpha chloromalonic diamide
Alpha bromomalonic diamide
Alpha fluoroadipic diamide
Alpha chloromaleic diamide
Alpha dichloroadipic diamide
Beta dichloroadipic diamide
Alpha, beta dibromopyrotartaric diamide
Alpha, beta dichloropyrotartaric diamide
Alpha, alpha', alpha'' tribromocarballylic triamide
Alpha, alpha', alpha'' trichlorocarballylic triamide
Alpha chloroaceto-acetamide
Alpha bromoaceto-acetamide
Alpha chlorohydantoic amide
Alpha bromohydantoic amide
Tetrachlorofuroamide
Tetrabromofuroamide
Alpha chloro, beta chloro adipic diamide It also will be understood that in each of the specific halogenated amides above mentioned the particular halogen shown may be replaced by some other halogen, care being taken in the choice of the halogen in the light of the properties desired in the final products. For example, when light-colored molded articles are desired, the use of iodo derivatives should be avoided and when the heat-convertible resins are to be used in the production of molding compositions, the fluoro derivatives preferably are avoided.

Where a plurality of halogen atoms are present in the halogenated amide, these may be the same or different. For example, one halogen in the molecule may be chlorine and another, bromine. In this way it is possible to obtain a heat-convertible resin of self-curing characteristics and other properties best adapted to meet a particular molding problem and service application of the finished article.

Likewise, it also will be understood that the aminotriazines named in the above examples are by way of illustration and that any other aldehyde-reactable aminotriazine may be employed. I prefer to use triazines containing either at least one unsubstituted amidogen (—NH₂) group or a plurality of partly substituted amidogen groups. Examples of such triazines which may be used in producing the new synthetic materials of this invention are ammeline, ammelide, formoguanamine, 2-amino 1,3,5-triazines and their substitution products; derivatives of melamine, e. g., 2,4,6-trihydrazino 1,3,5-triazine, melam, melon, 2,4,6-triethyltriamino 1,3,5-triazine, 2,4,6-triphenyltriamino 1,3,5-triazine, etc.; nuclearly substituted aminotriazines, e. g., 1-cyano 2-amino 4,6-dimethyl 1,3,5-triazine, 2-chloro 4,6-diamino 1,3,5-triazine, 6-methyl 2,4-diamino 1,3,5-triazine, 2-alkyl 4-amino 6-hydroxy 1,3,5-triazines (e. g., 2-methyl 4-amino 6-hydroxy 1,3,5-triazine), 2-aryl 4-amino 6-hydroxy 1,3,5-triazines (e. g., 2-phenyl 4-amino 6-hydroxy 1,3,5-triazine, etc.); poly-amino triazines wherein the hydrogen atoms of one or all of the amino groups are partially substituted by other amino groups, e. g., 2,4-diamino 6-hydrazino 1,3,5-triazine, 2-amino 4,6-dihydrazino 1,3,5-triazine, 2,4,6-trihydrazino 1,3,5-triazine, etc.; poly-amino triazines wherein the hydrogen atoms of one or all of the amino groups are partially substituted by other monovalent substituents (e. g., alkyl, aryl, aralkyl, alkaryl, etc.), for instance 2-amino 4,6-diethylamino 1,3,5-triazine, 2-amino 4,6-diphenylamino 1,3,5-triazine, 2-methylamino 4-amino 6-chloro 1,3,5-triazine, 2,4-diamino 6-phenylamino 1,3,5-triazine, symmetrical trialkyl and triaryl melamines; the amidogen 1,2,3-triazines and the amidogen 1,2,4-triazines, specifically the amino (—NH₂) and the carbamyl (—CONH₂) and the thiocarbamyl (—CSNH₂) 1,2,3- and 1,2,4-triazines. Additional examples of aminotriazines are given in various copending applications of mine and of Gaetano F. D'Alelio and James W. Underwood, for instance in my copending applications Serial No. 371,393 and Serial No. 371,394, filed December 23, 1940, Serial No. 378,933 and Serial No. 378,934, filed February 14, 1941, Serial No. 400,649, filed July 1, 1941, now Patent No. 2,294,873, issued September 1, 1942, Serial No. 404,661, filed July 30, 1941; in D'Alelio and Underwood copending applications Serial No. 400,148 and 400,149, filed June 27, 1941, now Patent Nos. 2,317,738 and 2,317,739, respectively, issued April 27, 1943; and in applications referred to in the aforesaid copending application.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, benzaldehyde, furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives of urea, thiourea, selenourea and iminourea, and of substituted ureas, thioureas, selenoureas and iminoureas (numerous examples of which are given in my copending application Serial No. 377,524, filed February 5, 1941, and assigned to the same assignee as the present invention), mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in my copending application Serial No. 377,524. Particularly good results are obtained with active methylene-containing bodies such as mono- and di-methylol ureas and the methylol melamines, e. g., mono-, di-, tri-, tetra-, penta- and hexa-methylol melamines. Mono- or poly-(N-carbinol) derivatives, specifically the mono- or poly-methylol derivatives, of an aminotriazine may be caused to react with the halogenated amides used in carrying the present invention into effect, in which case it is not necessary to use an aminotriazine and an aldehyde as individual starting reactants. Mixtures of aldehydes and aldehyde-addition products may be employed, for example mixtures of formaldehyde and methylol compounds such, for instance, as dimethylol urea and trimethylol melamine.

A part of the aminotriazine reactant may be replaced if desired by, for example, a urea, e. g., urea (NH₂CONH₂), thiourea, selenourea, iminourea and aldehyde-reactable substitution products thereof, e. g., methyl urea, phenyl thiourea, etc., by aldehyde-addition products of a urea, e. g., dimethylol urea, etc., or by other organic compounds capable of reacting with an aldehyde, e. g., an amino pyrimidyl carbamyl-alkyl sulfide. Numerous examples of compounds embraced by the term "a urea" are given in my copending application Serial No. 289,277. I may use either a single or a plurality of halogenated amides with the aminotriazine reactant or with the aminotriazine and urea reactants. Various aminodiazines, aminodiazoles or aminotriazoles may be used in place of a part of the aminotriazine.

The ratio of the aldehydic reactant to the aminotriazine may be considerably varied but, in general, it is desirable to use at least one mol of an aldehyde for each mol of aminotriazine. In producing the heat-convertible resinous condensation products of this invention, the proportion of the halogenated amide in all cases is at least sufficient to render the resin convertible under heat to an insoluble, infusible state. Ordinarily not exceeding substantially ⅛ mol halogenated amide is used for each mol of aminotriazine. No advantage accrues from using an amount of halogenated amide above the minimum required to secure the desired curing rate. Further, the use of higher amounts of halogenated amide is undesirable for most molding applications because of the greater difficulty in obtaining molded articles of suitable hardness, but may not be objectionable for other applications of the material. Also, in some cases, particularly where high molecular weight halogenated amides as for example alpha chlorostearamide are used, the amide part of the resin molecule exceeds on a weight basis the aminotriazine portion of the molecule. Consequently, in such cases the inherent characteristics (for example, waxy nature) of the high molecular weight halogenated amide predominate in the resin molecule. This may be objectionable in some applications of the molded part, for example where resistance to the ordinary organic solvents is required.

From the foregoing it will be seen that the particular mol ratio of halogenated amide to the other components is dependent somewhat upon the inherent characteristics and other properties desired in the heat-curable and heat-cured resinous condensation products. The aldehydic reactant may be used, for example, in an amount corresponding to from one to five or six mols thereof for each mol of aminotriazine. Good results usually are obtained by using from 1½ to 3¼ mols of aldehyde, specifically formaldehyde, for each mol of aminotriazine. Taking melamine (an aminotriazine containing three unsubstituted amidogen groups) as illustrative of the aminotriazine, particularly good results are obtained with approximately three mols aldehyde, e. g., formaldehyde, for each mol melamine. If the aminotriazine contains only two unsubstituted amidogen groups (or one unsubstituted and two partly substituted amidogen groups), then one advantageously may use approximately two mols aldehyde for each mol of an aminotriazine. If the aminotriazine contains only one unsubstituted amidogen group (or two partly substituted amidogen groups), then no particular advantage usually accrues from using much in excess of one mol aldehyde for each mol of such an aminotriazine. When the aldehyde is available for reaction in the form of an aldehyde-addition product such, for instance, as dimethylol urea, trimethylof melamine, etc., then higher amounts of such aldehyde-addition products ordinarily are used, for example, up to ten or twelve mols of such aldehyde-addition product for each mol of the aminotriazine.

When an aldehyde-addition product of an aminotriazine, e. g., trimethylol melamine, is used as a reactant with a halogenated amide of the kind with which this invention is concerned, such aldehyde-addition product functions in a dual capacity in that it provides a source for the introduction of both an aminotriazine and an alkylene bridge, e. g., —CH$_2$— into the resin molecule. The aldehyde-addition product may be used alone or together with an aminotriazine, or with an aldehyde or with both an aldehyde and an aminotriazine.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, isobutyl, hexyl, etc., alcohols; polyhydric alcohols such as ethylene glycol, diethylene glycol, glycerine, pentaerythritol, polyvinyl alcohol, etc.; amides such as formamide, acetamide, stearamide, acrylamide, benzamide, toluene sulfonamides, benzene disulfonamides and trisulfonamides, adipic diamide, phthalamide, etc.; amines, e. g., ethylene diamine, aniline, phenylene diamine, etc.; phenol and substituted phenols, e. g., the aminophenols, the cresols, the xylenols, the tertiary alkyl phenols and other phenols such as mentioned in my Patent 2,239,441; ketones; nitriles, e. g., acrylonitrile, methacrylonitrile, succinonitrile, etc.; and others. Those modifying agents which are reactable with the aminotriazine, or with the aldehyde or with the reaction product of the aminotriazine and the aldehyde (that is, an aldehyde-addition product of the aminotriazine, e. g., trimethylol melamine) may be incorporated into the composition by mixing all the reactants and effecting condensation therebetween or by various permutations of the reactants as described, for example, in my Patent 2,239,441 with particular reference to reactions involving a phenol, an aliphatic aldehyde and a malonic compound (page 3, column 1, lines 2-24).

The modifying bodies also may take the form of high molecular weight bodies with or without resinous characteristics, for example hydrolyzed wood products, formalized cellulose derivatives, lignin, protein-aldehyde condensation products, resinous reaction products of aldehydes, for example formaldehyde, with the aminotriazoles (e. g., guanazole, phenyl guanazole, etc.), alone or admixed with, for example, urea, melamine, or urea and melamine, resins obtained by reaction of an aldehyde with the aminodiazines (e. g., 2,4,6-triaminopyrimidine, 2,4 - diaminoquinazoline, etc.) or with the aminodiazoles, alone or admixed with, for example, urea, melamine or urea and melamine. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers including polyvinyl acetals, specifically polyvinyl formal, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a variety of shapes under heat and pressure, more particularly at temperatures of the order of 100° to 200° C., preferably from 120° to 180° C. Molding pressures may be varied considerably, but usually are within the range of 1,000 to 10,000 pounds per square inch, more particularly from 2,000 to 4,000 or 5,000 pounds per square inch.

From the foregoing description it will be seen that the present invention provides new and useful compositions of matter comprising a condensation product (in heat-curable or heat-cured state) of ingredients comprising essentially an aminotriazine (amidogentriazine), e. g., melamine, an aldehyde, e. g., formaldehyde, and a halogenated amide selected from the class consisting of alpha halogenated amides, beta halogenated amides and alpha beta halogenated amides, which amides contain at least one —CONH$_2$ grouping. The scope of the invention also includes method features for the production of such condensation products. For instance, one method feature of the invention comprises effecting partial reaction between ingredients comprising an aminotriazine, specifically melamine, and an aldehyde, e. g., formaldehyde (or ingredients comprising a urea, specifically NH$_2$COHN$_2$, an aminotriazine and an aldehyde) in the presence of an alkaline condensation catalyst, specifically a condensation catalyst comprising ammonia and a fixed alkali, adding a small amount of one or more of the hereindescribed halogenated amides, e. g., a halogenated acetamide such as mono-, di- or tri-chloroacetamide or mixtures thereof, mono-, di- or tri-bromoacetamides or mixtures thereof, etc., to the resulting partial condensation product and causing the halogenated amide to intercondense with the said partial condensation product. My invention also provides thermosetting (heat-hardenable) molding compositions comprising a filler, e. g., a cellulosic filler, and a heat-curable condensation product of this invention, e. g., a heat-hardenable (heat-curable) condensation product of ingredients comprising melamine (or urea and melamine), formaldehyde or compounds engendering formaldehyde, and an alpha, a beta or an alpha and beta halogenated amide having in its molecule at least one —CONH$_2$ grouping, as well as molded articles of manufacture comprising the heat-set molding compositions.

The modified and unmodified resinous compositions of this invention have a wide variety of uses. For example, in addition to their use in the production of molding compositions, they may be employed as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the condensation product of ingredients comprising an aminotriazine, an aldehyde and a halogenated amide selected from the class consisting of alpha halogenated amides, beta halogenated amides and alpha beta halogenated amides, which amides contain at least one —CONH$_2$ grouping.

2. A composition as in claim 1 wherein the condensation product is an alcohol-modified condensation product of the stated components.

3. A composition as in claim 1 wherein the aminotriazine is melamine.

4. A heat-curable resinous condensation product of ingredients comprising an aminotriazine, formaldehyde and a halogenated amide selected from the class consisting of alpha halogenated amides, beta halogenated amides and alpha beta halogenated amides, which amides contain at least one —CONH$_2$ grouping.

5. A product comprising the cured resinous condensation product of claim 4.

6. A composition comprising the product of reaction of (1) a partial condensation product of ingredients comprising an aminotriazine and an aldehyde and (2) a halogenated amide selected from the class consisting of alpha halogenated amides, beta halogenated amides and alpha beta halogenated amides, which amides contain at least one —CONH$_2$ grouping.

7. A resinous composition comprising the product of reaction of (1) a partial condensation product obtained by reaction, while admixed with an alkaline substance, of ingredients comprising melamine and formaldehyde, and (2) a halogenated amide selected from the class consisting of alpha halogenated amides, beta halogenated amides and alpha beta halogenated amides, which amides contain at least one —CONH$_2$ grouping.

8. A resinous composition comprising the product of reaction of (1) a partial condensation product obtained by reaction, while admixed with a condensation catalyst comprising ammonia and a fixed alkali, of ingredients comprising melamine and formaldehyde, and (2) a halogenated acetamide.

9. A resinous composition obtained by reaction of ingredients comprising melamine, formaldehyde and a chlorinated acetamide.

10. A resinous composition comprising the product of reaction of ingredients comprising urea, melamine, formaldehyde and monochloroacetamide.

11. A composition comprising the product of reaction of ingredients comprising a methylol melamine and a halogenated amide selected from the class consisting of alpha halogenated amides, beta halogenated amides and alpha beta halogenated amides, which amides contain at least one —CONH$_2$ grouping.

12. A composition comprising the resinous product of reaction of ingredients comprising an aminotriazine, dimethylol urea and a halogenated amide selected from the class consisting of alpha halogenated amides, beta halogenated amides and alpha beta halogenated amides, which amides contain at least one —CONH$_2$ grouping.

13. A resinous composition comprising the product of reaction of ingredients comprising melamine, dimethylol urea and a chlorinated acetamide.

14. A heat-curable resinous condensation product of ingredients comprising urea, melamine, formaldehyde and a halogenated amide selected from the class consisting of alpha halogenated amides, beta halogenated amides and alpha beta halogenated amides, which amides contain at least one —CONH$_2$ grouping.

15. A product comprising the cured resinous condensation product of claim 14.

16. A thermosetting molding composition comprising a filler and a heat-hardenable resinous condensation product of ingredients comprising an aminotriazine, formaldehyde and a chlorinated acetamide.

17. An article of manufacture comprising the heat-set molding composition of claim 16.

18. The method of preparing new condensation products which comprises effecting reaction between ingredients comprising an aminotriazine, an aldehyde and a halogenated amide selected from the class consisting of alpha halogenated amides, beta halogenated amides and alpha beta halogenated amides, which amides contain at least one —CONH$_2$ grouping.

19. The method which comprises effecting partial reaction between ingredients comprising melamine, urea and formaldehyde in the presence of a condensation catalyst comprising ammonia and a fixed alkali, adding a small amount of a chlorinated acetamide to the resulting partial condensation product, and causing the chlorinated acetamide to intercondense with the said partial condensation product.

GAETANO F. D'ALELIO.

CERTIFICATE OF CORRECTION.

Patent No. 2,351,602. June 20, 1944.

GAETANO F. D'ALELIO.

It is hereby certified that error appears in the printed specification of the above numbered patent requiring correction as follows: Page 2, first column, line 58, after the word "like" insert a period; page 3, first column, line 48, for "amino-triazine-aldehyde" read --aminotriazine-aldehyde--; page 4, second column, line 52, for "parts" read --part--; page 5, second column, line 2, for "water-absorption. (The water absorption" read --water absorption. (The water-absorption--; page 7, first column, line 25, for "application" read --applications--; page 8, second column, line 39, for "$NH_2COHN_2$" read --$NH_2CONH_2$--; line 47, for "bromoacetamides" read --bromoacetamide--; and that the said Letters Patent should be read with this correction therein that the same may conform to the record of the case in the Patent Office.

Signed and sealed this 29th day of August, A. D. 1944.

Leslie Frazer (Seal) Acting Commissioner of Patents.